H. G. THOMPSON.
DAMPER.
APPLICATION FILED FEB. 17, 1914.

1,144,971. Patented June 29, 1915.

Witnesses:
Samuel W. Balch
James T. Saw

Inventor,
Henry G. Thompson,
by Dorsey & Cole
Attorneys.

UNITED STATES PATENT OFFICE.

HENRY G. THOMPSON, OF CLEVELAND, OHIO, ASSIGNOR TO THE A. C. WILLIAMS COMPANY, OF RAVENNA, OHIO, A CORPORATION OF OHIO.

DAMPER.

1,144,971.  Specification of Letters Patent.  Patented June 29, 1915.

Application filed February 17, 1914. Serial No. 819,214.

*To all whom it may concern:*

Be it known that I, HENRY G. THOMPSON, a citizen of the United States of America, residing at Cleveland, in the county of Cuyahoga and State of Ohio, have invented certain new and useful Improvements in Dampers, of which the following is a specification.

This invention relates to the construction of a wire spindle and a sheet-metal handle connected so that the handle is adapted for rotating the spindle.

The object of the invention is to provide a construction entirely suitable for the purpose intended and which is particularly adapted for manufacture in quantities with a minimum expenditure for labor and materials.

In the accompanying sheet of drawings which forms a part of this application the invention is illustrated in connection with a damper for regulating the passage of gases through a stovepipe in which—

Figure 1:
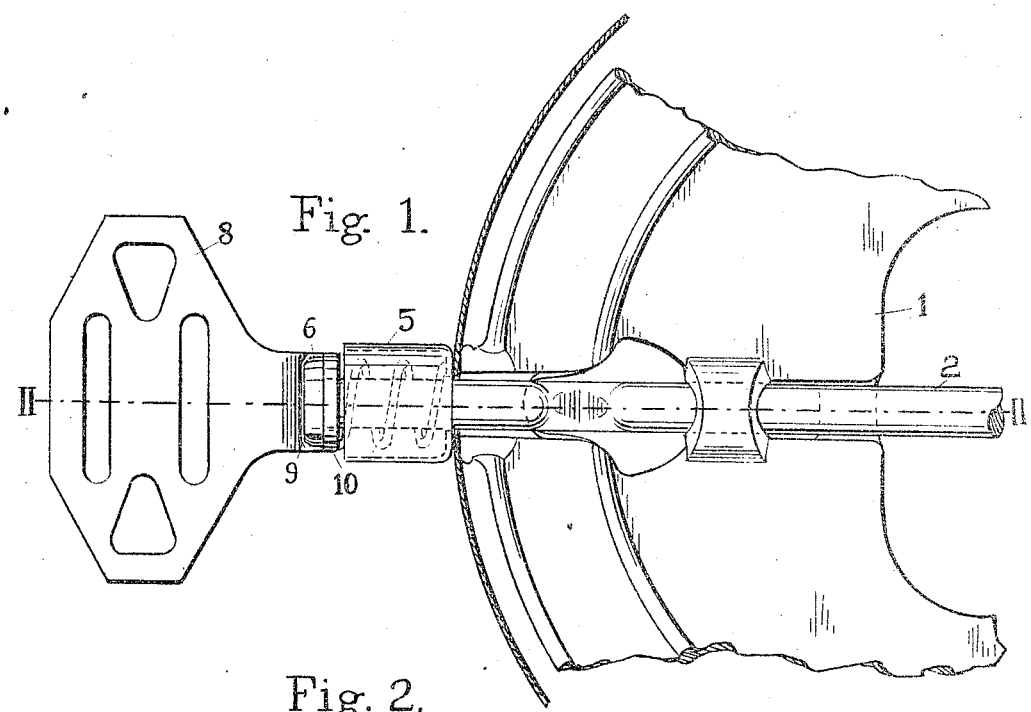
Figure 2:
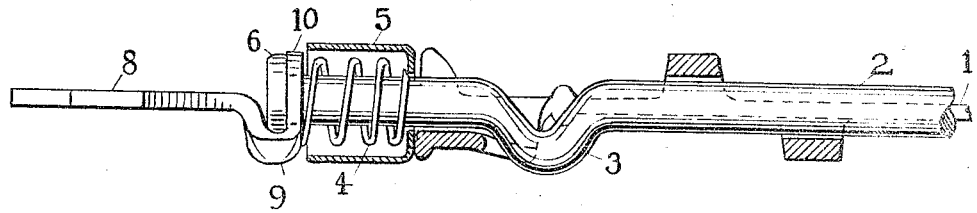
Figure 3:
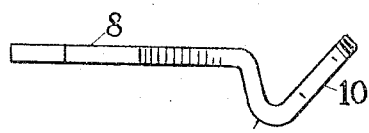
Figure 4:
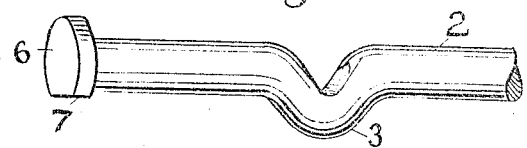

Figure 1 is a plan showing the handle, and a portion of the spindle and damper plate located in a stovepipe, Fig. 2 is a side view with the plate in section on the line II—II of Fig. 1, Fig. 3 is a side view of the handle stamping partly formed, Fig. 4 is a perspective of the end of the spindle to which the handle is attached.

The damper comprises a cast plate 1 through which a spindle 2 may be passed diametrically and the two locked together by means of a bend or projection 3 on the spindle, the projection being held in a notch in the casting by a spring 4. The spring is protected by a thimble 5. The spindle is formed with a flat head 6 and one side of the head is flattened at 7, but this flattening is not essential. A handle 8 is stamped from sheet-metal and has a shank 9 with an eye 10 in the end of the shank through which the spindle passes. The shank folds over the head of the spindle, the flattened side of the head, if there is one, is turned toward the fold of the shank. This fold is set up and swaged after the spindle has been threaded through the eye, and the head of the spindle is thereby tightly gripped and the edge of the head partly inclosed so that the handle and spindle must turn together. The tight gripping of the head by the shank and the engagement of the flat side of the head being each sufficient to insure the locking of the two so that they will turn together, and either or both means of locking may be relied upon.

I do not restrict my invention to stove dampers as it is applicable to any use in which a spindle requires to be provided with a handle.

What I claim as new, and desire to secure by Letters Patent of the United States, is—

1. In a damper, a combination of a damper plate, a spindle having a head, a handle for the spindle formed with a sheet metal shank tightly folded over the head, an eye in the end of the shank through which the spindle passes, and means for attaching the spindle and damper plate together, substantially as described.

2. In a damper, a combination of a damper plate, a spindle having a head flattened on one side, a handle for the spindle formed with a sheet metal shank tightly folded over the flattened side of the head, an eye in the end of the shank through which the spindle passes, and means for attaching the spindle and damper plate together, substantially as described.

Signed at Cleveland, in the county of Cuyahoga, State of Ohio, the 13th day of February, 1914.

HENRY G. THOMPSON.

Witnesses:
  WM. A. MARBACH,
  CORA H. DAVIS.